UNITED STATES PATENT OFFICE.

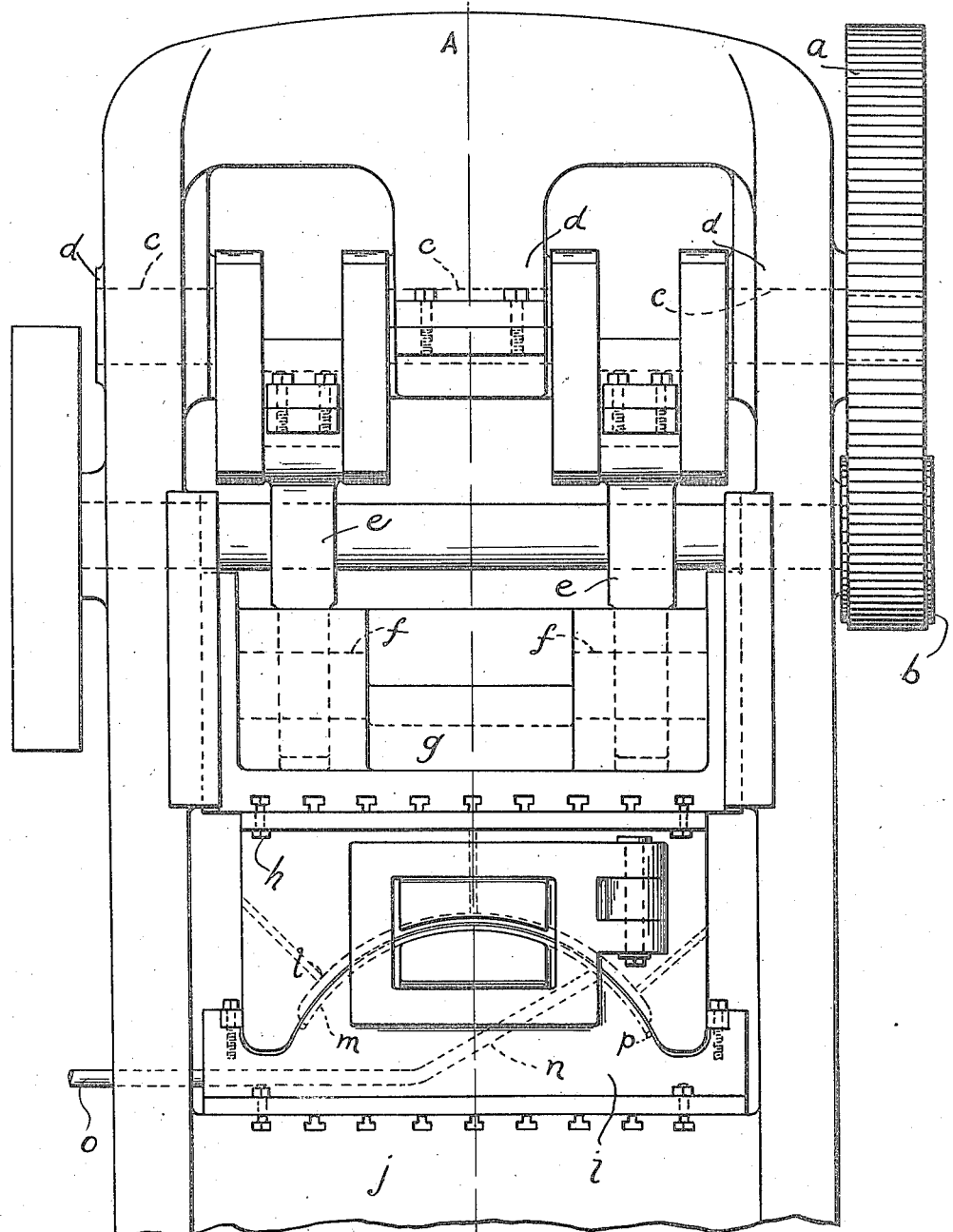

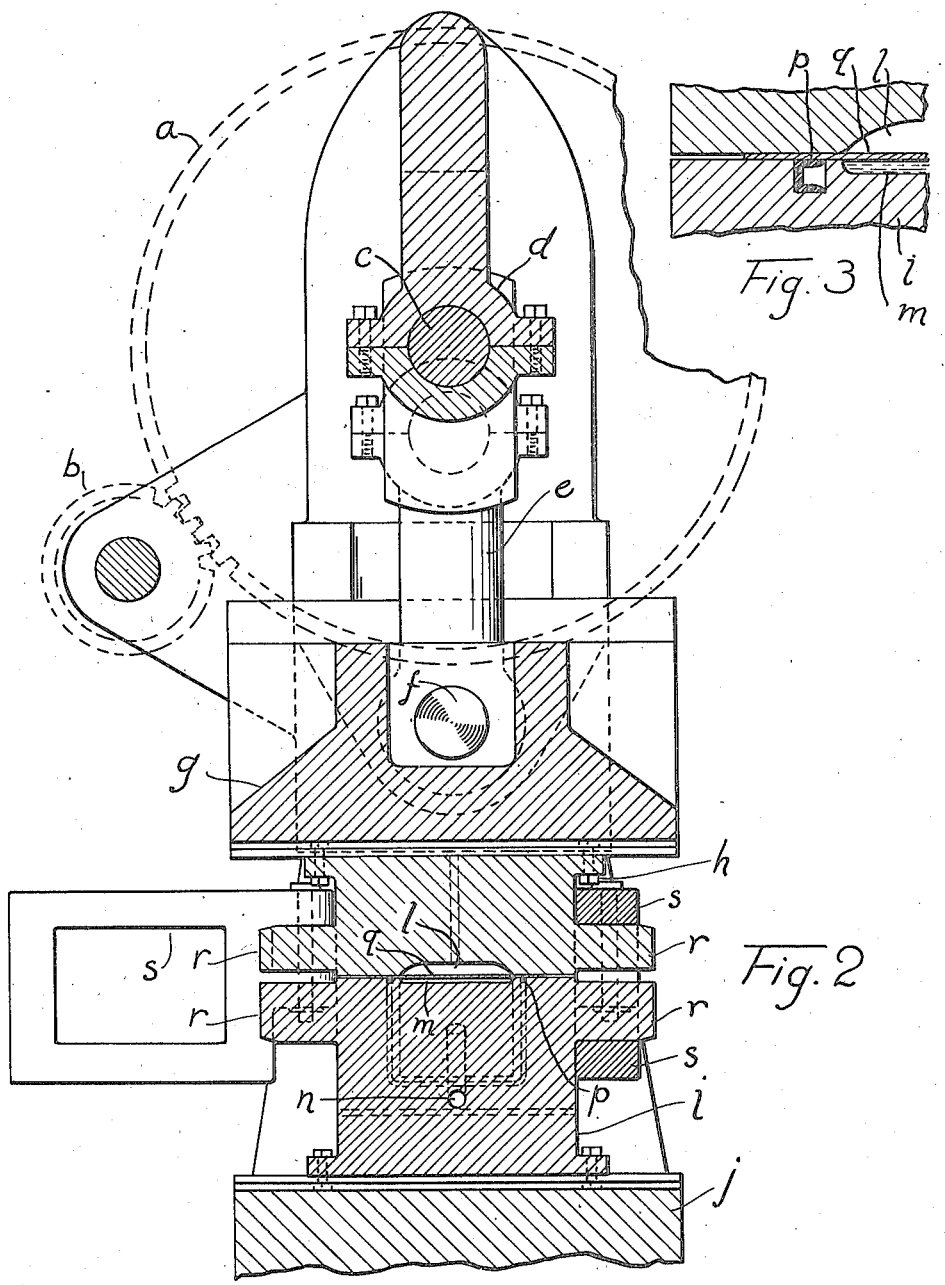

CONRAD REHBEIN, OF DETROIT, MICHIGAN, ASSIGNOR TO THE HAYES MANUFACTURING COMPANY, OF DETROIT, MICHIGAN, A CORPORATION OF MICHIGAN.

FLUID-PRESS.

1,180,739.     Specification of Letters Patent.     Patented Apr. 25, 1916.

Application filed August 23, 1915. Serial No. 46,873.

*To all whom it may concern:*

Be it known that I, CONRAD REHBEIN, a citizen of the United States, residing at Detroit, county of Wayne, State of Michigan, have invented a certain new and useful Improvement in Fluid-Presses, and declare the following to be a full, clear, and exact description of the same, such as will enable others skilled in the art to which it pertains to make and use the same, reference being had to the accompanying drawings, which form a part of this specification.

This invention relates to apparatus for drawing sheet metal into various configurations and especially for heavy sheet metal work which has heretofore ordinarily been done by a stamping operation.

Since the advent of the crown fender for automobiles it has been somewhat of a problem to properly stamp these crowns, especially where the crown is somewhat deep. The shallow crowns have been successfully stamped by the aid of heavy rubber pads and sometimes they have been stamped with solid male and female dies. The success of either of these methods depends to considerable extent upon the particular job that is undertaken. In a case of crown fenders, seat backs, automobile hoods, cowls and other sheet metal stampings used on automobile bodies, it has been found that great difficulty is experienced when a deep draw is required or especially when a particular configuration does not easily lend itself to a solid male and female die operation. For instance, some of the crown fenders of automobiles approximate half a circle or more in their longitudinal dimension. It is, therefore, quite evident that where solid dies are used, no pressure can be had at the ends of the fender, which is necessary in order to raise the crown.

It is to obviate the difficulties and the limitations heretofore found existent in the forming of automobile body sheet metal parts that the present apparatus is directed.

In the drawings, Figure 1 is a front elevation of a press known as the crank type press. Fig. 2 is a vertical section of the same taken on the line A—A of Fig. 1. Fig. 3 is a section of die parts showing a modified form of gasket.

In the press, $a$ is a large gear wheel in mesh with the small pinion $b$ from which the power is transmitted to the large gear wheel under a considerable speed reduction. The gear wheel $a$ is keyed to the crankshaft $c$ which is supported in suitable bearings $d$, $d$ of the press frame.

The crankshaft is provided with a pair of offset crank pins upon which are rotatably mounted the upper ends of the connecting rods $e$. The lower ends of these connecting rods are pivoted upon the wrist pins $f$ which are attached to the ram $g$. The ram $g$ is suitably guided in its vertical movements by the uprights of the press frame. The lower face of the ram is provided with a plurality of cross grooves, T-shaped in cross section. These receive the bolt heads of the bolts $h$ which pass through flanges on the upper die. Hence by tightening the nuts on the ends of the bolts the upper die may be secured in any desired relation with respect to the ram. Similarly the lower die $i$ is secured to the bolster $j$.

Now, referring more particularly to Fig. 2, it will be seen that the upper or female die is provided with a concavity $l$ which in cross section is shown to be of a proper contour to form a crown on an automobile fender. This concavity considered longitudinally is of proper shape and dimension to accord with the type of fender desired. The male die is provided with a shallow concavity or distributing chamber $m$ and into this leads a passage-way $n$ through the lower die. A feed-water pipe $o$ connects with this passageway $n$ and through this water under pressure may be forced. The lower die is provided with a small rubber insert strip $p$. This acts as a gasket between the lower die and the sheet of metal $q$.

The method is as follows: A sheet of metal having been inserted between the dies and coated with a composition fluid known as "drawing compound", and the dies brought together, water under very heavy pressure is admitted through the inlet pipe $o$ and into the shallow distributing chamber $m$ of the male die. As the pressure gradually increases the portion of the sheet metal $q$ which is caught between the two concavities is gradually raised. The pressure is continued until it gets to be tremendous, amounting in some drawing operations to as high as 1,500 pounds per square inch. This draws the metal into the concavity of the upper or female die. Inasmuch as the water pressure works equally well in any direction, it matters little what the configuration of the die or the completed work is. However, the success of this water press forming operation depends largely upon the ability to resist the tremendous pressure tending to urge the dies apart when a maximum water pressure has been achieved. If these dies are allowed to separate sufficient distance to allow the tremendous pressure to blow the gaskets out the consequences would be disastrous to those in the vicinity. To obviate these dangers each of the dies is provided at front and rear with an integral projecting lug r. At both front and rear of one of the dies a swinging gate s is hung. These are very heavy gates built of very strong and thick frames with large openings at the centers. When the dies are brought together each gate is adapted to swing over each pair of lugs r, r. When water pressure is turned in between the dies and it begins to separate them, the gates bind on the lugs by a very heavy friction which not only prevents the gates from opening, but prevents the dies from being separated. When the maximum pressure has been reached, the pressure is released and the gates may then be pried open with crow-bars.

Fig. 3 shows a modified form of gasket in which a U gasket lying on its side is used. The water gets in between the two strips of the gasket and hence tends to drive these two strips apart and thereby affords a very tight liquid seal.

What I claim is:

1. In a press for forming sheet metal, the combination of a ram and bolster, a pair of dies secured to the same, one of which is provided with a shaping concavity and the other of which is provided with a distributing chamber, means for supplying a liquid under heavy pressure to the distributing chamber and means located wholly on the dies for holding the dies together and preventing their separation under the heavy liquid pressure between the dies.

2. In a press for forming sheet metal, the combination of a ram and bolster, a pair of dies secured to the same, one of which is provided with a shaping concavity and the other of which is provided with a distributing chamber, means for supplying liquid under heavy pressure to the distributing chamber, and means solely on the dies and on their sides for locking the dies against separation.

3. In a press for forming sheet metal, the combination of a ram and bolster, a pair of dies secured thereto, one of which is provided with a shaping concavity and the other of which is provided with a distributing chamber, means for supplying liquid under heavy pressure to the distributing chamber, one or more gates on the dies and one or more projecting members on each die with which the gates can be made to engage to hold the dies from separation.

4. In a press for forming sheet metal, the combination of a ram and bolster, a pair of dies secured thereto, one of which is provided with a shaping concavity and one of which is provided with a distributing chamber, means for supplying liquid under pressure to the distributing chamber, one or more lugs on each die and one or more swinging members mounted on the dies for engaging the lugs to lock the dies from separation.

5. In a press for forming sheet metal, the combination of a press frame having uprights, a ram and die forming one operating pair and guided in their movements by the said uprights of the press, means for reciprocating the ram, a bolster and die constituting the other operating pair of the press, the said dies being formed one with a shaping concavity and the other with a water distributing chamber adapted to receive water under heavy pressure for forcing the sheet metal into the shaping concavity of the other die, and means for tying the two operating pairs together, the said means being located wholly on the two operating pairs and wholly independent of the press frame and means for reciprocating the ram.

6. In a press for forming sheet metal, the combination of a press frame having uprights, a ram and die forming one operating pair and guided in their movements by the said uprights of the press, means for reciprocating the ram, a bolster and die constituting the other operating pair of the press, the said dies being formed one with a shaping concavity and the other with a water distributing chamber adapted to receive water under heavy pressure for forcing the sheet metal into the shaping concavity of the other die, and one or more gates located wholly on the two operating pairs for interlocking the two operating pairs and tying them together wholly independent of the press frame and means for reciprocating the ram.

In testimony whereof, I sign this specification.

CONRAD REHBEIN.